US012754065B2

(12) United States Patent
Cai et al.

(10) Patent No.: US 12,754,065 B2
(45) Date of Patent: Oct. 6, 2026

(54) MULTISPAN OPTICAL FIBER SYSTEM AND TECHNIQUES FOR IMPROVED DISTRIBUTED ACOUSTIC SENSING

(71) Applicant: SUBCOM, LLC, Eatontown, NJ (US)

(72) Inventors: Jin-Xing Cai, Morganville, NJ (US); Carl R. Davidson, Warren, NJ (US); William W. Patterson, Freehold, NJ (US); Alexei N. Pilipetskii, Colts Neck, NJ (US)

(73) Assignee: SubCom, LLC, Eatontown, NJ (US)

( * ) Notice: Subject to any disclaimer, the term of this patent is extended or adjusted under 35 U.S.C. 154(b) by 478 days.

(21) Appl. No.: 18/224,486

(22) Filed: Jul. 20, 2023

(65) Prior Publication Data

US 2024/0027261 A1 Jan. 25, 2024

Related U.S. Application Data

(60) Provisional application No. 63/391,041, filed on Jul. 21, 2022.

(51) Int. Cl.
*G01H 9/00* (2006.01)
*G01D 5/353* (2006.01)

(52) U.S. Cl.
CPC ......... *G01H 9/006* (2013.01); *G01D 5/35361* (2013.01)

(58) Field of Classification Search
CPC ............................... G01H 9/004; G01H 9/006
See application file for complete search history.

(56) References Cited

U.S. PATENT DOCUMENTS

2013/0113629 A1 5/2013 Hartog et al.
2019/0238178 A1 8/2019 Huang et al.
2023/0184622 A1 * 6/2023 Alfataierge ............ G01L 25/00 356/73.1

OTHER PUBLICATIONS

Document No. SEAFOM—Measuring Sensor Performance Document—02 (SEAFOM MSP-02) DAS Parameter Definitions and Tests Issue Date: Aug. 2018, https://seafom.com/published-documents/.
European Search Report for EP Application No. 2318641.0, dated Aug. 12, 2023, 8 pages.
Hari Datta Bhatta et al., "Dynamic Measurements of 1000 Microstrains Using Chirped-Pulse Phase-Sensitive Optical Time-Domain Reflectometry," IEEE, Fellow, Journal of Lightwave Technology, vol. 37, No. 18, Sep. 15, 2019, 8 pages.
Faruk Uyar et al., "A Direct Detection Fiber Optic Distributed Acoustic Sensor With a Mean SNR of 7.3 dB at 102.7 km," IEEE Photonics Journal, vol. 11, No. 6, Dec. 2019, 9 pages.

* cited by examiner

*Primary Examiner* — Erika J. Villaluna
(74) *Attorney, Agent, or Firm* — KDW Firm PLLC

(57) ABSTRACT

A distributed acoustic sensing system. The DAS system may include a distributed acoustic sensing (DAS) station, comprising: a DAS transmitter, arranged to launch an outbound DAS signal through an optical fiber, over at least one span; a DAS receiver, arranged to receive a backscatter Rayleigh signal, based upon the DAS signal; and at least one component, coupled to the DAS transmitter, the DAS receiver, or both, and arranged to increase a sensitivity for sensing of the DAS system.

16 Claims, 5 Drawing Sheets

MULTISPAN OPTICAL FIBER SYSTEM AND TECHNIQUES FOR IMPROVED DISTRIBUTED ACOUSTIC SENSING

RELATED APPLICATIONS

This application claims priority to U.S. provisional application Ser. No. 63/391,041, entitled MULTISPAN OPTICAL FIBER SYSTEM AND TECHNIQUES FOR IMPROVED DISTRIBUTED ACOUSTIC SENSING, filed Jul. 21, 2022, and incorporated by reference herein in its entirety.

BACKGROUND

Field

Embodiments of the present disclosure relate to the field of optical fiber communication systems. In particular, the present disclosure relates to techniques for extending and improving the sensitivity of distributed acoustic sensing (DAS) in undersea optical cables.

Discussion of Related Art

In a distributed acoustic sensing (DAS) system, an optical cable may be used to provide continuous real-time or near real-time monitoring of perturbations or anomalies in the vicinity of the cable. In other words, the cable itself may be used as a sensing element to detect or monitor different types of disruptions, interferences, irregularities, acoustic vibrations activities, whether natural or man-made occurring in or out of the undersea environment, etc. in the DAS environment (e.g., terrestrial environment, oceanic). To do so, optoelectronic devices/equipment coupled to the optical cable of the DAS system may detect and process reflected light signals (e.g., Rayleigh backscatter signals) over a range at a specific distance in the cable system.

Generally, a DAS system may include a station that acts as an interrogator unit (IU) to probe a fiber optic cable using a coherent laser pulse, where changes in the phase, frequency, amplitude, time of arrival or state of polarization of the returning optical backscatter signal are measured. Optical phase shifts between pulses may be proportional to strain in the fiber, leading to the ability to detect vibrations and the like, as measured by the effect of such perturbations on the phase. For example, the DAS system may be based on Rayleigh backscattering (otherwise referred to as a Rayleigh-backscattering-based DAS system).

In known approaches, distributed sensing is limited to <50 km to 150 km and only one fiber span can be sensed. The sensing fiber used can be Multi-Mode Fiber (MMF), Single-Mode Fiber (SMF), special sensing fiber or other fiber types with positive dispersion, typically exhibiting low loss which leads to higher sensing sensitivity. Note that current systems using Distributed Acoustic Sensing (DAS) equipment, employ single mode fiber (SMF) or other fibers with positive dispersion and low loss. Accordingly, the DAS range and sensing capabilities of known DAS systems is significantly limited.

It is with respect to these and other considerations that the present disclosure is provided.

BRIEF SUMMARY

In one embodiment, a distributed acoustic sensing system is provided. The DAS system may include a distributed acoustic sensing (DAS) station, comprising: a DAS transmitter, arranged to launch an outbound DAS signal through an optical fiber, over at least one span; a DAS receiver, arranged to receive a backscattered Rayleigh signal, based upon the DAS signal; and at least one component, coupled to the DAS transmitter, the DAS receiver, or both, and arranged to increase the sensing sensitivity of the DAS system.

In another embodiment, a method of operating a distributed acoustic sensing system may include launching an outbound distributed acoustic sensing (DAS) signal from a DAS transmitter of a DAS station through an optical fiber, over at least one span; receiving a backscattered Rayleigh signal, based upon the DAS signal, at a DAS receiver; and performing at least one processing operation to increase the sensing sensitivity during the launching of the outbound DAS signal and the receiving of the backscattered Rayleigh signal.

In a further embodiment, a distributed acoustic sensing system may include a distributed acoustic sensing (DAS) station. The DAS station may include a DAS transmitter, arranged to launch an outbound DAS signal through an optical fiber, over at least one span; and a DAS receiver, arranged to receive a backscattered Rayleigh signal, based upon the DAS signal. The DAS station may further include a first acousto-optic modulator (AOM), arranged to receive the outbound DAS signal, a first amplifier, to receive a first output signal of the first AOM and to increase the intensity of the outbound DAS signal, and a second AOM, arranged to receive an output of the first amplifier. The DAS station may also include a narrow bandwidth optical filter, arranged to receive an output from the first amplifier, wherein the narrow bandwidth optical filter has a bandwidth, the bandwidth being between 1 GHz and 10 GHz.

DESCRIPTION OF EMBODIMENTS

Figure 1:
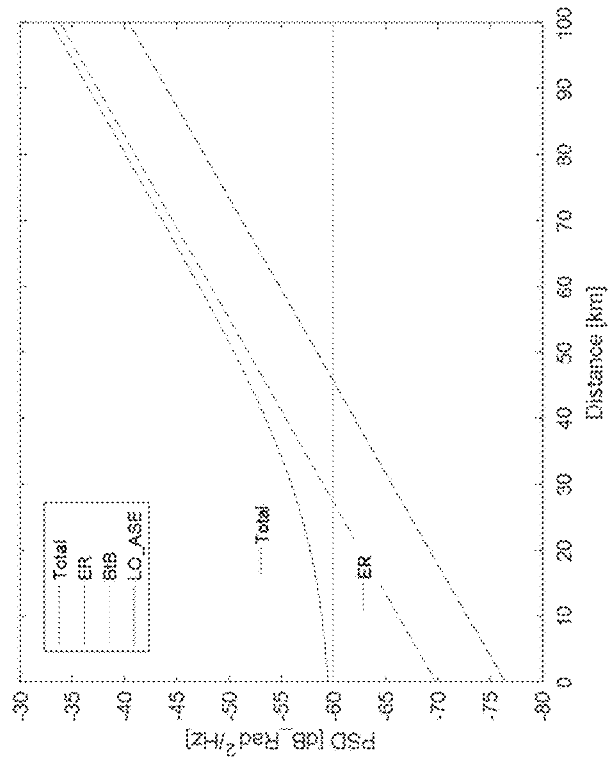
FIG. 1 shows the noise floor power spectral density (PSD) as a function of sensing distance for DAS system constructed as a single 100-km span.

The present embodiments will now be described more fully hereinafter with reference to the accompanying drawings, in which exemplary embodiments are shown. The scope of the embodiments should not be construed as limited to the embodiments set forth herein. Rather, these embodiments are provided so that this disclosure will be thorough and complete, and will fully convey the scope of the embodiments to those skilled in the art. In the drawings, like numbers refer to like elements throughout.

Before detailing specific embodiments with respect to the figures, general features with respect to the embodiments will be reviewed. Novel DAS apparatus, systems, and architecture, and techniques are provided to improve DAS sensing capability, and in particular the sensitivity.

Increase Extinction Ratio of a Sensing Signal

In some embodiments, techniques and apparatus are provided to increase the Extinction Ratio (ER) of a sensing signal. FIG. 1 shows the noise floor power spectral density (PSD) as a function of sensing distance for a DAS system constructed as a single 100-km span. The noise floor power spectral density (PSD) from the sensing span is a measure of the noise level and determines the sensitivity at a specific location. The units of PSD are dB rad 2/Hz or dB radigHz and a lower value is better. The top curve represents the total PSD, while the other curves represent specific contributions to the PSD including finite Extinction Ratio (ER) from transmitter, local oscillator and amplified spontaneous emission (LO_ASE) beating noise from receiver, and the overall DAS equipment limitation (Back-to-Back or BtB). As generally demonstrated by FIG. 1, the distributed sensing sensitivity heavily depends on ER of the sensing signal. Note that acousto-optic modulators (AOM) often offer 50 to 70 dB ER. However, the duty cycle of a sensing signal is very low (for example, 35 dB for 2 kHz sensing frequency, with 150 ns or 30 m gauge length). Hence, the Signal to Noise Ratio (SNR) of the sensing signal goes down significantly (from an ER of 70 dB down to only 35 dB). In this example, the noise floor (PSD) is limited by the contribution from ER at distances greater than 20-km distance. Hence, improving the DAS signal ER may be useful to limit PSD in practical DAS sensing systems.

Figure 2A:
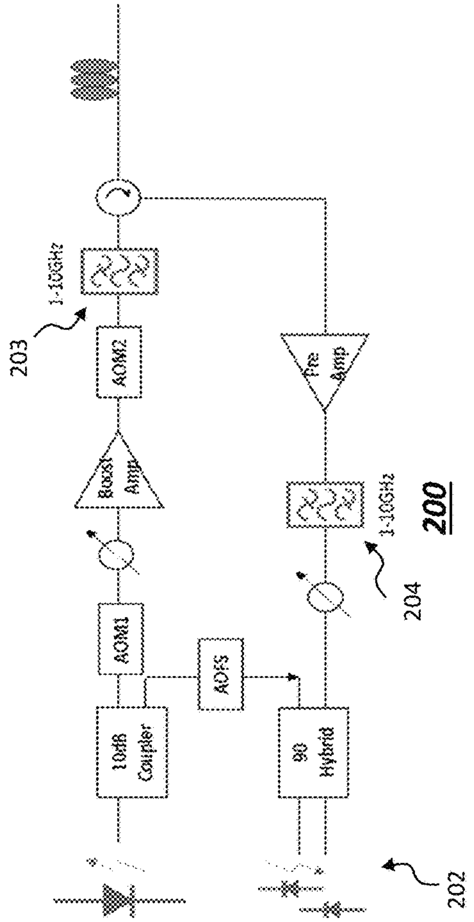
FIG. 2A depicts a DAS system, arranged according to embodiments of the disclosure.
Figure 2B:
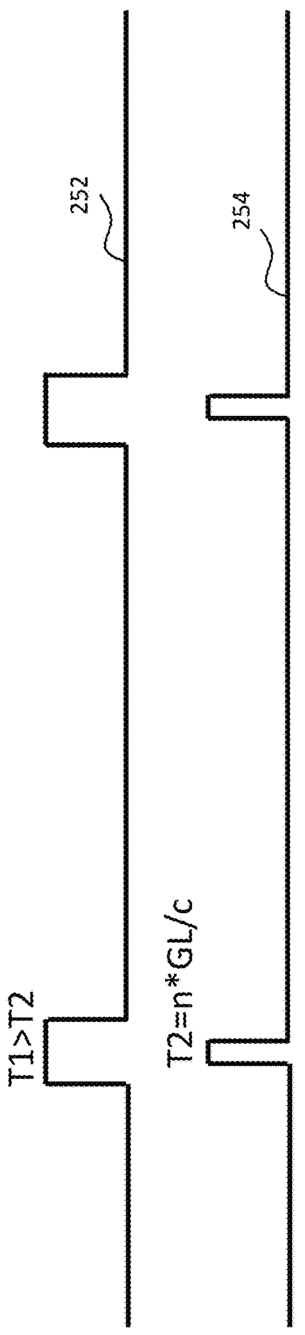
FIG. 2B shows an exemplary DAS pulse traces.

FIG. 2A illustrates the architecture of a DAS system 200, according to embodiments of the disclosure, and FIG. 2B illustrates exemplary DAS pulses. The DAS system 200 includes, among other features, a DAS station 202, represented by a light emitting diode symbol, an optical coupler (for example 10-dB), and two acousto-optic modulators (AGMs), shown as AOM1 and AOM2. The AOM1 is located on an outbound path before an amplifier, such as a booster Erbium-Doped Fiber Amplifier (EDFA) and may be driven by a wider pulse (see curve 252, $T_1$, FIG. 2B, having a lower modulation loss). AOM1 also introduces spectral broadening to increase the stimulated Brillouin scattering (SBS) threshold. AOM2 is located after the booster EDFA and is driven by a narrower pulse (see curve 254, $T_2=n*GL/c<T_1$), where n is the fiber refractive index, GL is the gauge length in meters and c is the speed of light in vacuum.

The salient features of the implementation shown in FIG. 2A include the use of two AOMs, one AOM located before and one AOM located after a booster EDFA, and the setting of the relative pulse widths, wherein $T_2<T_1$. With $T_1>T_2$ as shown in FIG. 2B (with the pulses arranged center-aligned). Thus, the input signal to the booster EDFA is high, so the Optical Signal to Noise Ratio (OSNR) after the booster amplifier is high, therefore mitigating (OSNR) degradation. Thus, in the embodiment of FIG. 2A, by concatenating two AOMs, the noise floor is significantly reduced. By optimizing $T_1$, high ER and high OSNR for the sensing signal may be simultaneously achieved.

Using Narrow Tx Optical Filter to Reduce the Seed Signal

Figure 3:
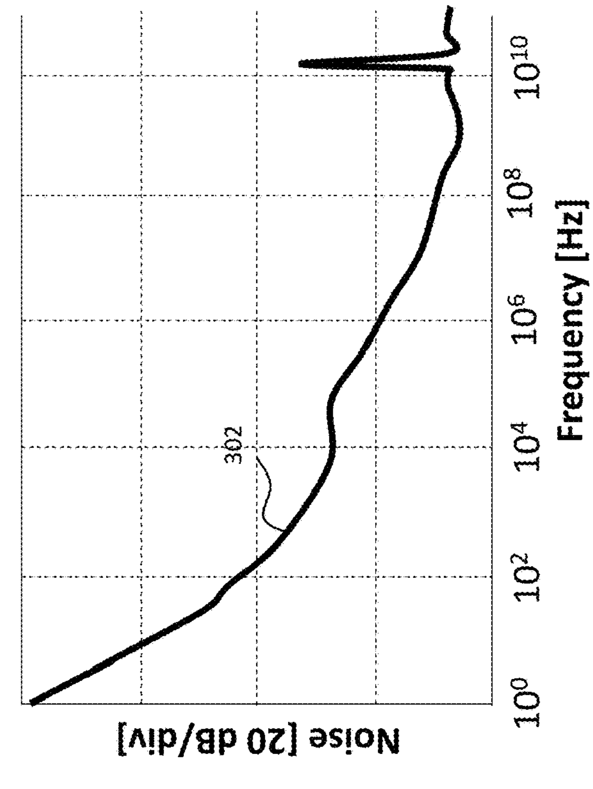
FIG. 3 shows an idealized depiction of a reference relative intensity noise (RIN) spectrum of a sensing laser.

In distributed sensing, the received signal power is typically low due to the high loss from the backscattered Rayleigh process (~35 dB); hence high launch peak power is needed. However, this high peak power generates nonlinearity and amplifies the system noise (seed), and accordingly depletes the sensing signal. The seed arises from the sensing laser Relative Intensity Noise (RIN) and the Amplified Spontaneous Emission (ASE) from the booster amplifier. FIG. 3 shows a curve 302, representing an exemplary RIN spectrum of a sensing laser. As shown, there is a very strong frequency component in the 10 GHz region, due to relaxation oscillation. Hence, selecting lasers with low RIN for a source to generate the DAS signal is very useful.

Returning to FIG. 2A, the DAS system 200 may include an optical filter 203, located after the booster EDFA, that serves to limit both the laser-generated RIN (especially the 10 GHz components) and the ASE that may be generated from the booster EDFA, hence reducing the nonlinear interference (NLI) power due to Modulation Instability (MI) or Four Wave Mixing (FWM).

Using Narrow Rx Optical Filter to Reduce the Receiver Noise

Figure 4A:
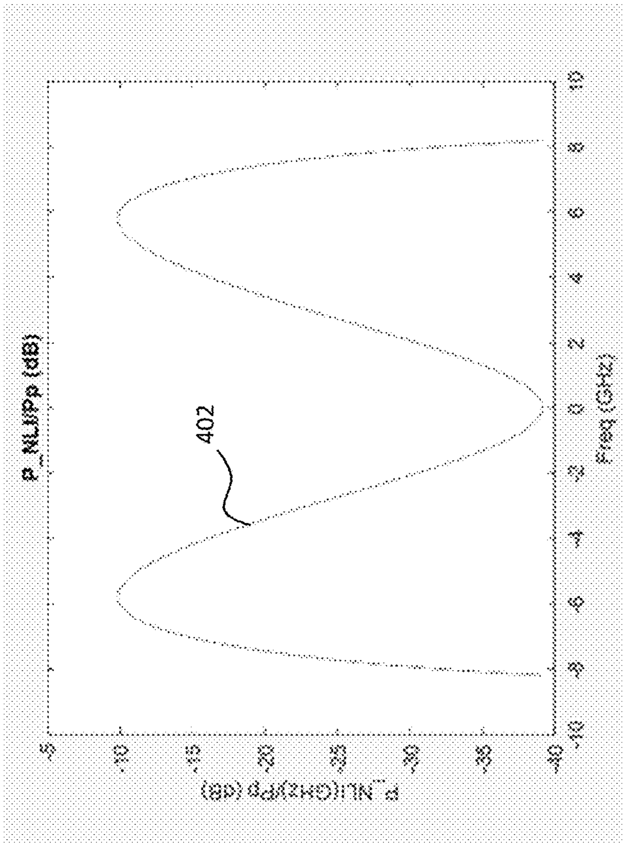
FIG. 4A and FIG. 4B illustrate the noise response to a DAS sensing signal as a function of frequency with respect to the DAS sensing channel optical frequency for a D+ fiber and D− fiber span, respectively.
Figure 4B:
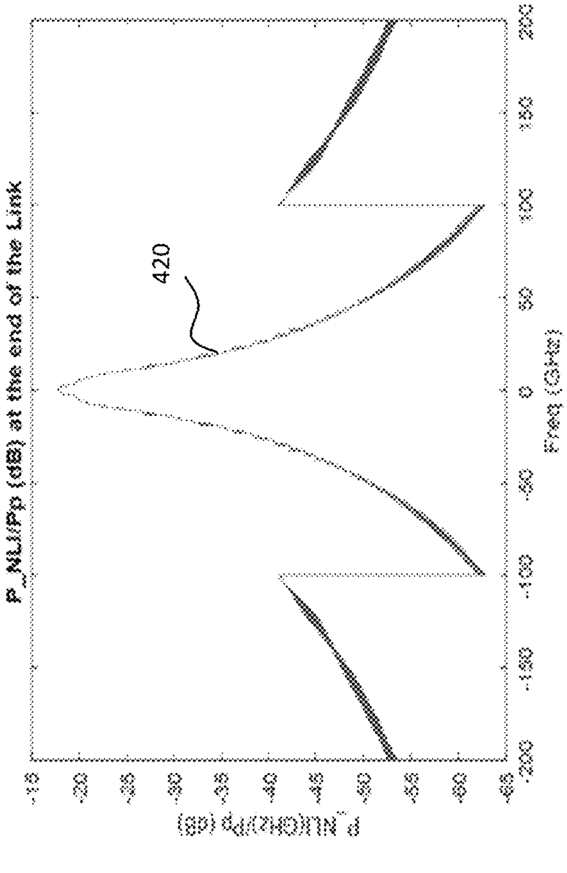
Figure 4C:
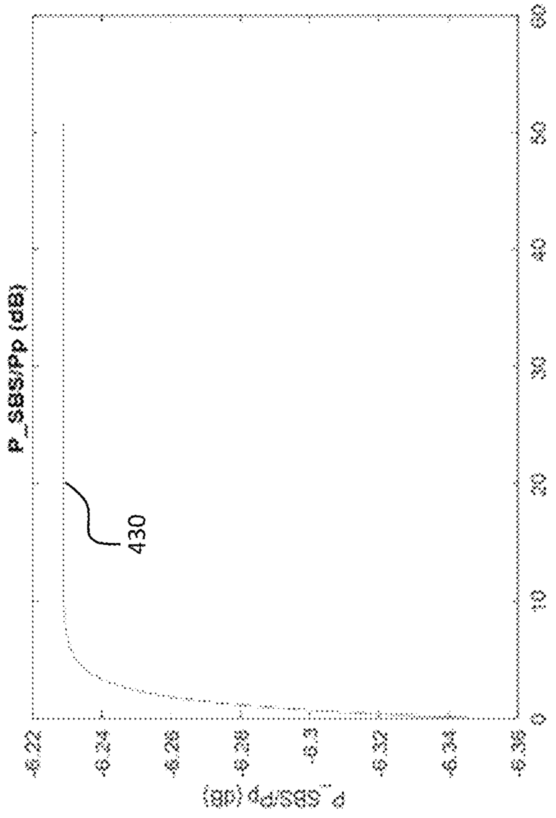
FIG. 4C illustrates the DAS signal power (Pp) depletion due to the stimulated Brillouin scattering (SBS) process (P SBS) vs distance.

Noise-noise beating may lead to a significant penalty when the common mode rejection ratio (CMRR) of a coherent receiver is lower than a certain value, such as 20 dB. In optical sensing, MI/FWM generated Nonlinear Interference (NLI) noise around the sensing signal is much higher. NLI is well known to be extremely detrimental in systems containing a D+ fiber. In D+ fiber systems, MI typically may exhibit a peak ~10 GHz after a single span, and this peak may be 30 dB higher than the center of the sensing signal. FIG. 4A shows MI generated NLI after 20 spans, the peak frequency shifted to ~6 GHz and this peak is ~30 dB higher than the center of the sensing signal, this NLI is generated with 10 dB lower optical power when compared to a single span. FWM generated NLI also have a BW ~10 GHz, and may reach −10 dB of the sensing signal, as shown in curve 420 of FIG. 4B by integrating all NLI noise within +/−5 GHz bandwidth. This FWM/MI signal can be further amplified (in the reverse direction) by the SBS process to further deplete the sensing signal (see curve 430 of FIG. 4C). Returning to the DAS system 200 of FIG. 2A, by placing an optical filter of bandwidth <10 GHz (in some cases a BW<1 GHz) in the receiver, these NLIs may be significantly reduced.

In the embodiment of the DAS system 200 of FIG. 2A, the placement of optical filtering in both transmitter and receiver leads to an increase in the receiver OSNR. The narrow transmitter optical filtering, such as using optical filter 203, can reduce the seed power to the nonlinear process. Reducing the NLI power will slow down the DAS signal power depletion. The narrow receiving filter 204 serves to limit the NLI noise power to the photo diode in the DAS receiver.

Frequency Shift Tracker

Figure 5:
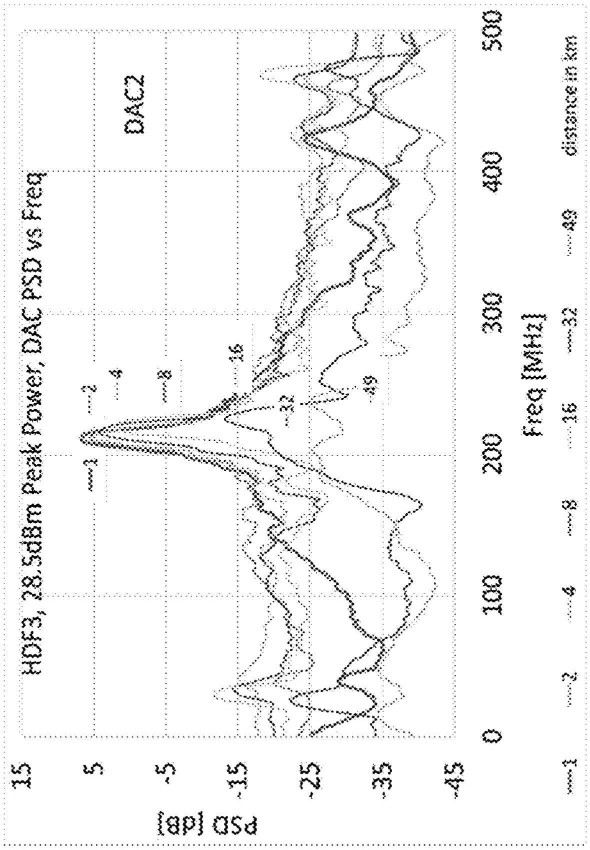
FIG. 5 shows experimentally the measured frequency shift in the power spectral density (PSD) of a received DAS signal for a single 50-km span (P=0.7 W or 28.5 dBm, maximum in the lab)

In known DAS systems, the high peak power of the sensing signal may cause a very large optical phase shift. This phase shift is converted to additional frequency shift after optical heterodyne detection, as expressed in the following equations:

$$\Delta f_{NLI} = \frac{\Delta\phi}{2\pi\Delta t} = \frac{\gamma^{PL_e}}{0.3\pi}\text{MHz}\ \Delta t = 150\ \text{ns}$$

where $\Delta f_{NLI}$ is the NLI induced frequency shift, $\Delta\phi$ is the NLI induced phase shift in radians, $\Delta t$ is the DAS pulse width (150 ns for 30 m gauge length), $\gamma$ is the fiber nonlinear coefficient, P is the peak DAS signal (pump) power at the fiber input and $L_e$ is the effective fiber length. The total frequency shift after optical heterodyne is $\Delta f_{NLI}+\Delta f_{AOM}$, where $\Delta f_{AOM}$ is the total linear frequency induced by the AOMs in the DAS transmitter, as shown in FIG. 2A. The $\Delta f_{AOM}$ may be ~200 MHz and $\Delta f_{NLI}$ may be ~52 MHz after 1 span of HDF3 fiber (P=1 W, $\gamma$=1.2/W-km), in one example. FIG. 5 shows experimentally measured frequency shifts in the power spectral density (PSD) of a received DAS signal for a single 50-km HDF3 fiber span (P=0.7 W, maximum in the lab). The PSD values are shown as a function of frequency at 1-, 2-, 4-, 8-, 16-, 32-, and 49-km. One can observe the frequency shift with increasing distance, as well as spectral splitting, and significant broadening at the end of the sensing span (49 km).

Figure 6:
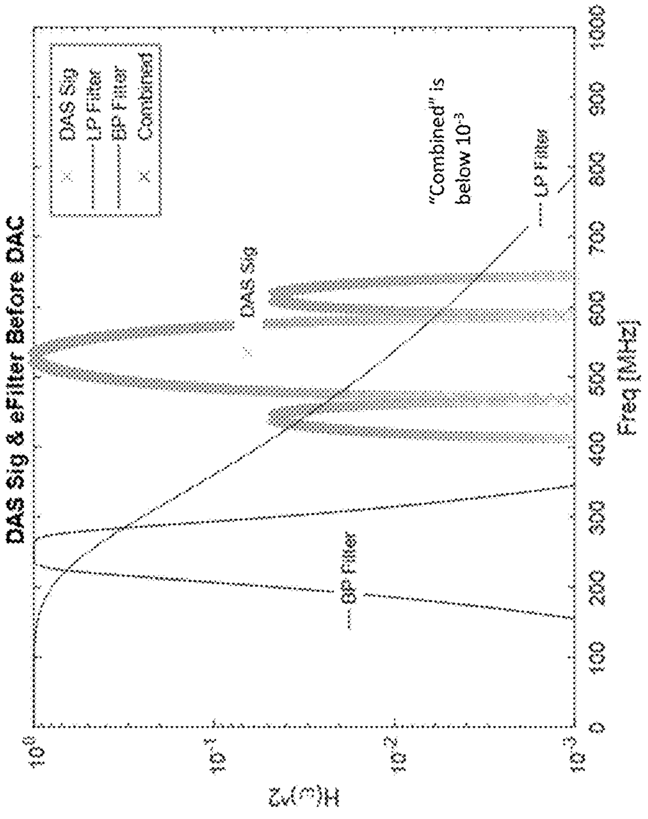
FIG. 6 is a composite graph showing a frequency shifted signal and a receiver bandwidth curve.

In a multi-span DAS sensing system, this NLI-induced frequency shift will add linearly. After a few spans, the accumulated frequency shift may be much larger than the receiver bandwidth. As illustrated in FIG. 6, the "DAS Sig" is shifted by more than 500 MHz, which shift may be beyond the receiver's electrical bandwidth (e.g., 500 MHz). In particular, the electrical bandwidth is the convolution of the low pass filter "LP Filter" curve and the bandpass filter "BP Filter" curve. The final filtered signal "Combined" does not appear in FIG. 6. In this case the signal is totally filtered out (well below the $10^{-3}$ level) by the convolution the aforementioned filters.

Figure 7:
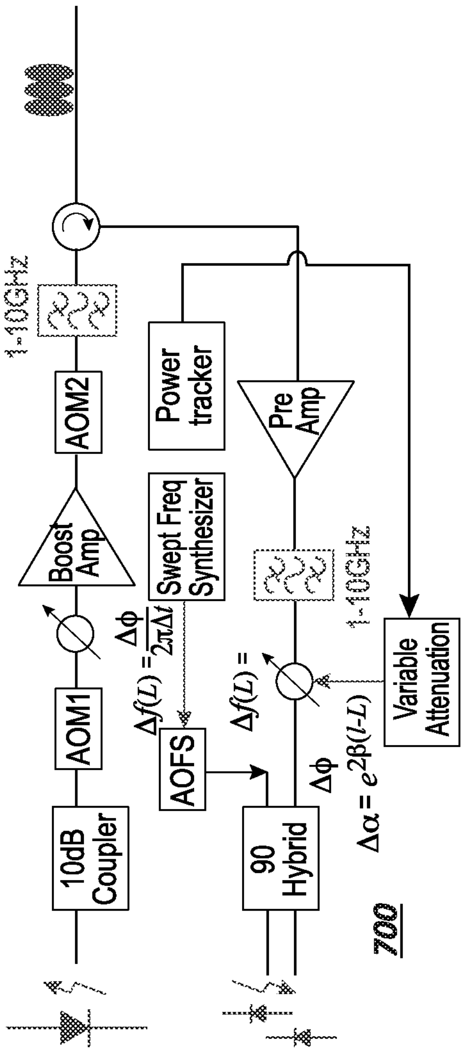
FIG. 7 depicts another DAS system, arranged according to further embodiments of the disclosure.

In accordance with further embodiments of the disclosure, FIG. 7 depicts another DAS system. In this embodiment, the DAS system 700 includes a swept frequency synthesizer, an acousto-optic frequency shifter (AOFS), and a variable attenuator, where the principles of operation of the DAS system 700 are detailed below.

In particular, the local oscillator frequency can be swept in a way such that:

$$\Delta f(t) = -\frac{\Delta\phi}{2\pi\Delta t} = -\frac{N_{pre\text{-}span}(\gamma P L_e) + \left[\frac{\gamma P\left(1 - e^{-\alpha\frac{c\cdot t}{2\cdot n}}\right)}{\alpha}\right]}{2\pi\cdot n\cdot GL/c}$$

where $N_{pre\text{-}span}$ is the number of spans preceding the sensing span, $$l = \frac{ct}{2n}$$

is the distance from the preceding optical amplifier (not the distance from the DAS sensing equipment), n is the fiber refractive index, $\alpha$ is the fiber loss, GL is the gauge length, and c is the speed of light in vacuum.

In other embodiments, other functions of frequency shift (linear, quadratic, etc.) may be used, as long as the total frequency shift $[\Delta f_{NLI}+\Delta f_{AOM}+\Delta f(t)]$ is well within the DAS receiver electrical bandwidth. In accordance with embodiments of the disclosure, a receiver digital signal processing (DSP) unit may be used to remove this additional frequency shift, so the phase induced by system change is dominant.

Figure 8:
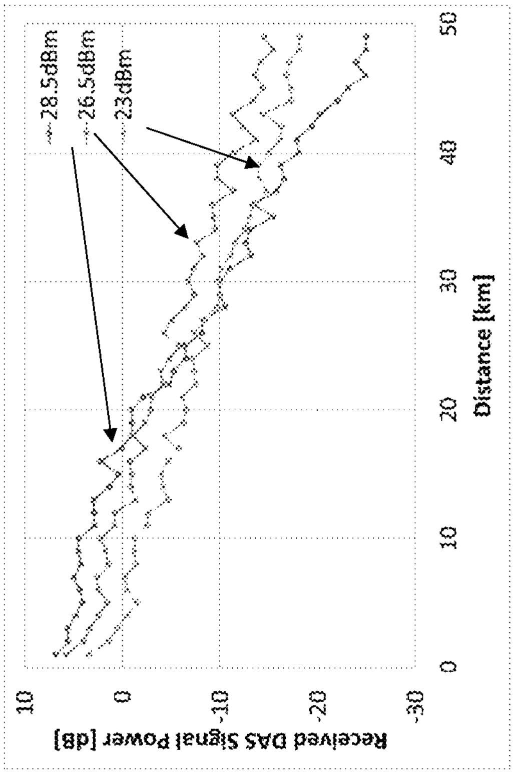
FIG. 8 shows the received power as a function of distance for three different values of launch power for a 50 km span with 0.2 dB/km loss.

In the embodiment of FIG. 7, this frequency sweep/shift may be provided by the acousto-optic frequency shifter (AOFS). Alternatively, the frequency sweep/shift may be provided by other optical modulators (including electrooptic components such as lithium niobate, electro absorption, etc.) that operate as a frequency shifter Sensing Signal Power Tracker In sensing schemes that use a Rayleigh backscattered signal, the received signal power change is twice the span loss in the linear transmission region. FIG. 8 is a graph that shows the received power as a function of distance at different DAS signal launch powers for a km span with 0.2 dB/km loss. In the linear range of power (23 dBm and 26.5 dBm in this example), the signal power decreases by ~20 dB over 50 km, while this power drop increases to dB when the DAS signal launch power increases to 28.5 dBm.

Note also that for a 100 km span with 0.2 dB/km fiber, the Rayleigh backscattered signal power varies by 40-dB even in the linear transmission region. However, all receivers have a maximum power limit to maintain the photo diode (PD) operation in the linear range. In this case, the power received from the far end of the sensing span may be too small and thus buried in the receiver noise. To address this issue, as further shown in the DAS system 700, a receiver power tracker may be provided to attenuate (or amplify less) the signal from the beginning of the span to avoid receiver saturation (see variable attenuation component of FIG. 7).

The received signal from the sensing span can be expressed as $P(l)=P_{Ray}(0)e^{-2\alpha l}$ in the linear transmission region, where $\alpha$ is the fiber loss, $P_{Ray}$ (0) and P(l) are the Rayleigh backscattering power from the near end of the fiber or from distance l. An attenuator or an amplifier can be programmed in such a way that:

$$P(l)' = [P_{Ray}(0)e^{-2\alpha l}]\cdot[e^{2\beta(l-L)}]$$

where P(l)' is the final received optical power at the PD from distance l, L is the total length of the span, $\beta$ is the newly introduced power decay/amplification factor and $2\alpha > 2\alpha - 2\beta$. Using such a power tracker approach, the power dependency changes from $e^{-2\alpha l}$ to $e^{-2(\alpha-\beta)l}$. In the above example equation, the power is not changed when l=L, so the DAS signal power is attenuated by $e^{-2\beta L}$ for the DAS signal from the beginning of the span (l=0) and no attenuation at all for the DAS signal from the end of the span (l=L). If $\alpha=\beta$, then the power profile is flat across the sensing distance.

In other embodiments, other functions for the power profile (linear, quadratic, etc.) may be employed, as long as the total power profile is much less than the DAS receiver linear dynamic range. In a receiver digital signal processing (DSP) component (not separately shown, but typically residing in the DAS station), this additional power profile may then be removed, so the power evolution induced by the DAS system is preserved. In different non-limiting embodiments, this power tracker may be implemented by 1) An optical programable attenuator having a large attenuation at the beginning of the span that gradually decreases to zero at the end of the span; and 2) an Optical pre-amplifier having smaller current or smaller gain for the signal from the beginning of a span, and a larger current or larger gain for the signal coming from the far side of the span.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A distributed acoustic sensing (DAS) system, comprising:

a distributed acoustic sensing (DAS) station, comprising:

a DAS transmitter, arranged to launch an outbound DAS signal through an optical fiber, over at least one span;

a DAS receiver, arranged to receive a backscatter Rayleigh signal, based upon the DAS signal;

a receiver power tracker, arranged to attenuate or reduce an amplification of the backscatter Rayleigh signal, from a beginning of the at least one span wherein the receiver power tracker comprises an optical programable attenuator having an attenuation that is relatively larger at the beginning of the at least one span, wherein the attenuation gradually decreases to zero at an end of the at least one span; or an optical pre-amplifier having a relatively smaller current or relatively smaller gain for the outbound DAS signal from the beginning of the at least one span, and a relatively larger current or a relatively larger gain for the outbound DAS signal, when coming from an end of the at least one span; and at least one component, coupled to the DAS transmitter, the DAS receiver, or both, and arranged to increase a sensitivity for sensing of the DAS system.

2. The distributed acoustic sensing system of claim 1, wherein the at least one component comprises:

a first acousto-optic modulator (AOM), arranged to receive the outbound DAS signal;

a first amplifier, to receive a first output signal of the first AOM and to increase an intensity of the outbound DAS signal; and a second AOM, arranged to receive an output of the first amplifier.

3. The distributed acoustic sensing system of claim 2, wherein a first width of the output signal of the first AOM is greater than a second width of a second output signal of the second AOM, and wherein the second output signal is centered in time on the first output signal.

4. The distributed acoustic sensing system of claim 3, wherein the second width is denoted by T2, wherein T2 is equal to n*GL/c, where n is a refractive index of the optical fiber, GL is a gauge length of the optical fiber in meters, and c is speed of light.

5. The distributed acoustic sensing system of claim 1, wherein the at least one component comprises:

a first amplifier, to receive the outbound DAS signal; and a narrow bandwidth optical filter, located in the DAS transmitter, and arranged to receive an output from the first amplifier, wherein the narrow bandwidth optical filter has a bandwidth, the bandwidth being between 1 GHz and 10 GHz.

6. The distributed acoustic sensing system of claim 1, wherein the at least one component comprises:

a narrow bandwidth optical filter, located in the DAS receiver and arranged to receive the backscatter Rayleigh signal, wherein the narrow bandwidth optical filter has a bandwidth, the bandwidth being less than 10 GHz.

7. The distributed acoustic sensing system of claim 6, wherein the bandwidth is less than 1 GHz.

8. The distributed acoustic sensing system of claim 1, wherein the at least one component comprises:

an optical frequency shifter, coupled between the DAS transmitter and the DAS receiver; and a swept frequency synthesizer, coupled to the optical frequency shifter.

9. A method of operating a distributed acoustic sensing system, comprising:

launching an outbound distributed acoustic sensing (DAS) signal from a DAS transmitter of a DAS station through an optical fiber, over at least one span;

receiving a backscatter Rayleigh signal, based upon the outbound DAS signal, at a DAS receiver;

performing at least one processing operation to increase a sensing sensitivity during the launching the outbound DAS signal and the receiving the backscatter Rayleigh signal; and using a receiver power tracker, selectively attenuating or reducing an amplification of the power of the backscatter Rayleigh signal, received from a beginning of the at least one span in comparison to a power of the backscatter Rayleigh signal from an end of the at least one span, opposite to the beginning, wherein the receiver power tracker comprises an optical programable attenuator having an attenuation that is relatively larger at the beginning of the at least one span, wherein the attenuation gradually decreases to zero at the end of the at least one span; or an optical pre-amplifier having a relatively smaller current or relatively smaller gain for the backscatter Rayleigh signal from the beginning of the at least one span, and a relatively larger current or relatively larger gain for the backscatter Rayleigh signal, when coming from an end of the at least one span.

10. The method of claim 9, further comprising:

receiving the outbound DAS signal at a first acousto-optic modulator (AOM);

receiving and an increasing an intensity of a first output signal of the first AOM at a first amplifier; and receiving an output of the first amplifier at a second AOM.

11. The method of claim 10, wherein a first width of the output signal of the first AOM is greater than a second width of a second output signal of the second AOM, and wherein the second output signal is centered in time on the first output signal.

12. The method of claim 11, wherein the second width is denoted by T2, wherein T2 is equal to n*GL/c, where n is a refractive index of the optical fiber, GL is a gauge length of the optical fiber in meters, and c is speed of light.

13. The method of claim 9, further comprising:

receiving the outbound DAS signal at a first amplifier; and receiving an output of the first amplifier at a narrow bandwidth optical filter, wherein the narrow bandwidth optical filter has a bandwidth, the bandwidth being between 1 GHz and 10 GHz.

14. The method of claim 9, further comprising:

receiving the backscattered Rayleigh signal at a narrow bandwidth optical filter, wherein the narrow bandwidth optical filter has a bandwidth, the bandwidth being less than 10 GHz.

15. The method of claim 14, comprising performing a frequency sweep/shift using an optical frequency shifter, coupled between the DAS transmitter and the DAS receiver.

16. A distributed acoustic sensing system, comprising:

a distributed acoustic sensing (DAS) station, comprising:

a DAS transmitter, arranged to launch an outbound DAS signal through an optical fiber, over at least one span;

a DAS receiver, arranged to receive a backscatter Rayleigh signal, based upon the outbound DAS signal;

a first acousto-optic modulator (AOM), arranged to receive the outbound DAS signal;

a first amplifier, to receive a first output signal of the first AOM and to increase an intensity of the outbound DAS signal;

a second AOM, arranged to receive an output of the first amplifier; and a narrow bandwidth optical filter, arranged to receive an output from the first amplifier, wherein the narrow bandwidth optical filter has a bandwidth, the bandwidth being between 1 GHz and 10 GHz a receiver power tracker, arranged to attenuate or reduce an amplification of the backscatter Rayleigh signal, from a beginning of the at least one span wherein the receiver power tracker comprises an optical programable attenuator having an attenuation that is relatively larger at the beginning of the at least one span, wherein the attenuation gradually decreases to zero at an end of the at least one span; or an optical pre-amplifier having a relatively smaller current or relatively smaller gain for the outbound DAS signal from the beginning of the at least one span, and a relatively larger current or a relatively larger gain for the outbound DAS signal, when coming from an end of the at least one span.

* * * * *